United States Patent [19]

Lee

[11] Patent Number: 4,669,887
[45] Date of Patent: Jun. 2, 1987

[54] DRY BLENDING WITH FIBERS

[75] Inventor: Donald M. Lee, Huntington, W. Va.

[73] Assignee: Ashland Oil, Inc., Ashland, Ky.

[21] Appl. No.: 831,240

[22] Filed: Feb. 19, 1986

[51] Int. Cl.[4] ............................................. B01F 15/02
[52] U.S. Cl. .................................... 366/155; 366/30;
366/76; 366/165; 366/290; 366/292
[58] Field of Search ................. 366/21, 30, 76, 13-15,
366/150, 154, 155, 165, 160, 162, 292, 182, 290,
291, 318, 325, 101, 102; 241/101 B

[56] References Cited

U.S. PATENT DOCUMENTS

| | | | |
|---|---|---|---|
| 1,960,030 | 5/1934 | Sackett | 366/155 X |
| 3,150,215 | 9/1964 | Houghton | 366/155 X |
| 3,314,398 | 4/1967 | Legourd | 366/154 X |
| 4,242,841 | 1/1981 | Ushakov et al. | 366/160 X |
| 4,427,645 | 1/1984 | Frenken et al. | 366/155 X |
| 4,501,047 | 2/1985 | Wrassman | 19/85 |
| 4,514,093 | 4/1985 | Coch et al. | 366/154 X |

FOREIGN PATENT DOCUMENTS 2619810  5/1976  Fed. Rep. of Germany ...... 366/160

OTHER PUBLICATIONS

Kevlar Aramid, "Guide to Processing Kevlar Aramid Fiber and Pulp for Friction Products", Dupont.

Primary Examiner—Timothy F. Simone
Attorney, Agent, or Firm—Richard C. Willson, Jr.; Stanley M. Welsh

[57] ABSTRACT

Disclosed is a method and apparatus for avoiding the clumping of fibers having diameters and lengths in certain ranges during dry blending of such fibers into a dry matrix material. The process comprises distributing fibers in a vaporous medium, and transporting fluidized fibers to a mixing zone containing a dry matrix material. Concurrently with stirring and blending of the dry matrix material with fluidized fibers, the fluidized fibers having been separated at least partially from a fluidized vapor are gradually introduced into the mixing zone. This process avoids the phenomena of "balling" that otherwise occurs with certain fibers.

13 Claims, 6 Drawing Figures

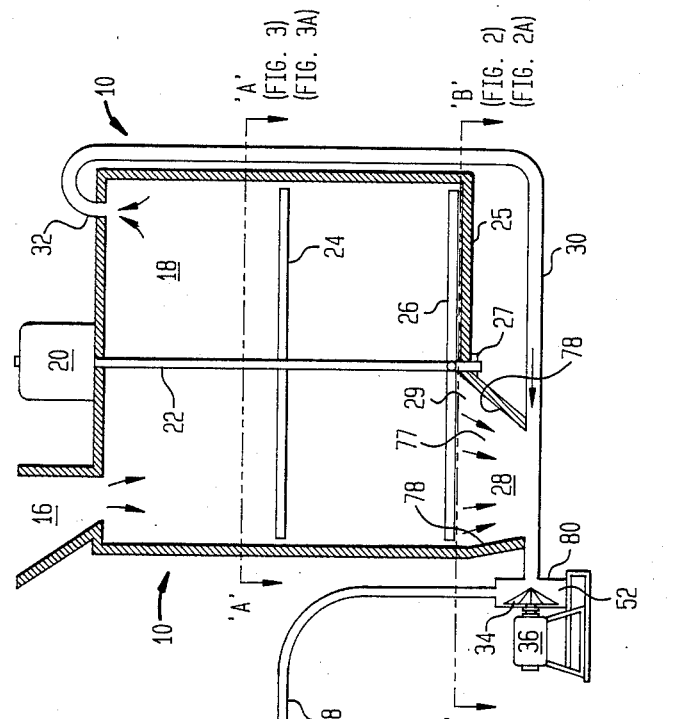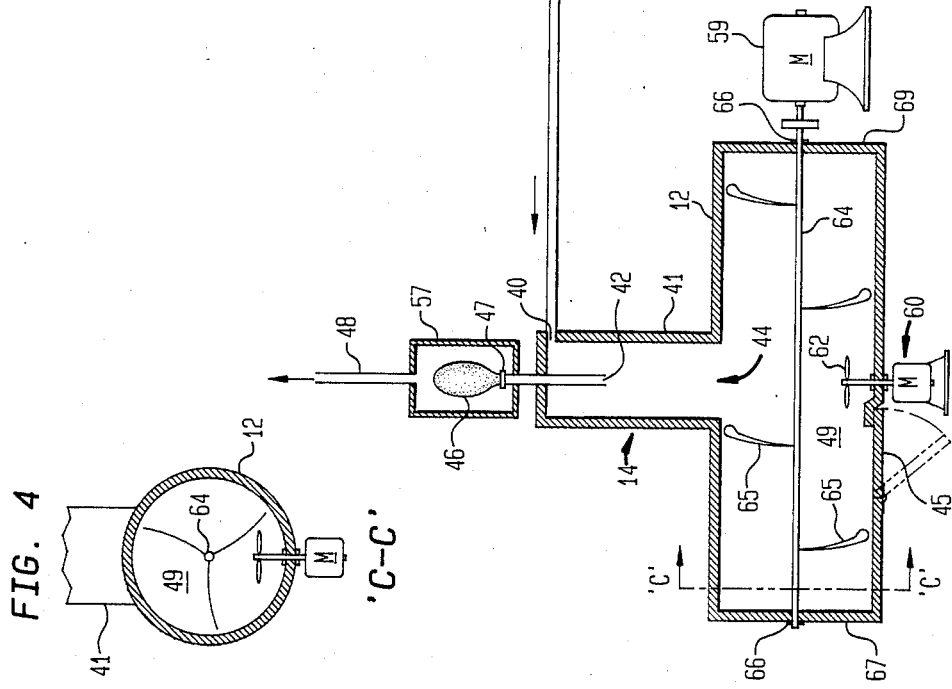
FIG. 1
FIG. 4

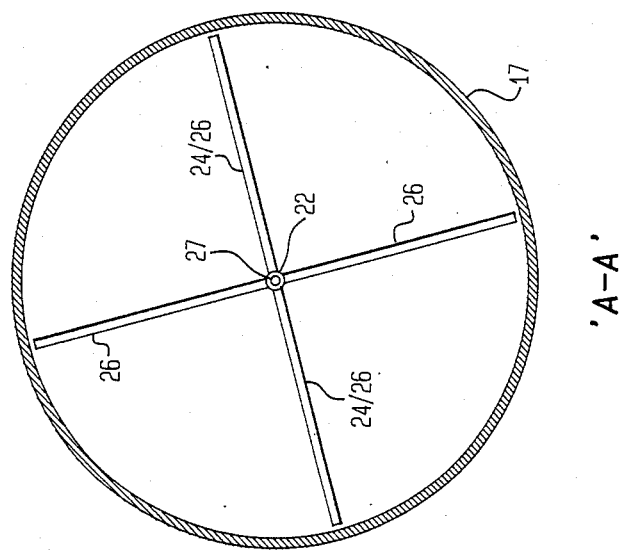
FIG. 3  'A-A'
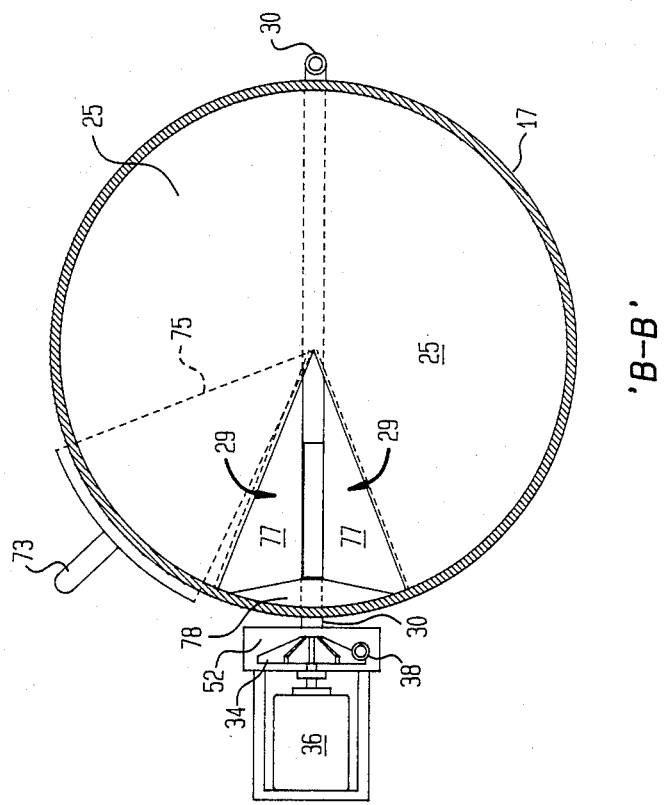
FIG. 2  'B-B'

'A-A'

'B-B'

DRY BLENDING WITH FIBERS

BACKGROUND OF THE INVENTION

The field of this invention relates to dry compounding of fibrous components in a binder matrix. More specifically, this invention relates to the use of carbon fibers and binder matrices for use in brake pad applications.

PRIOR ART

Brake pads are conventionally made by resin reinforced materials and then machined into appropriate shapes. Examples of appropriate resins that are used in brake pads are phenolic resins. Necessary attributes of brake pads are their ability to withstand mechanical compression, maintain their shape, withstand high temperatures, and distribute friction uniformly.

Currently, the fibrous reinforcement for brake pads is usually provided by asbestos. However, in light of asbestos' hazards and the need for work place safety for employees, substitutes for asbestos are in demand. Primary characteristics that make asbestos a useful fibrous reinforcement material in brake pads are its high temperature, performance, high strength and light weight.

It is these same characteristics that make carbon fiber a particularly attractive substitute. Unfortunately, the carbon fibers which produce the best results tend to be those which are most uniform in terms of diameter and length. This is unfortunate because it is precisely the uniformity of length and diameter which tends to result in a phenomena which for purposes for this specification will be referred to as the "balling tendency".

In a mix of dry fibrous carbon fibers, there is a tendency for the carbon fibers to clump together in spheroidal particles. These particles are made up of clumped and intertwined discrete carbon fibers. Once carbon fibers have formed tightly agglomerated closely interacting bundles of carbon fibers, they do not uniformly distribute throughout a dry binder matrix during stirring.

European patent application, having publication number 0125511 and application number 84104229.4 with a date of filing Apr. 13, 1984, entitled "Carbon Fiber—Reinforced Gypsum Models and Forming Molds, Gypsum Powdered Materials for Making Such Models and Molds, and a Method for Producing Them", discloses usefulness of carbon fibers as reinforcement materials. Also disclosed is the fact that carbon fibers are apt to form lumps. To insure uniform dispersion of carbon fibers having lengths ranging from 5 to 100 mm, prior to addition to a gypsum slurry, bundles of carbon fibers are separated into single fibers by dispersing them in water with supersonic agitation. Once the carbon fibers have been uniformly dispersed in a gypsum slurry, they will tend to remain separated provided the ratio of amount of the carbon fibers to gypsum is very small.

The following patents are examples of technology relating to friction elements of the type which are often employed in brakes of automotive vehicles. U.S. Pat. No. 2,428,298 of R. E. Spokes et al entitled "Friction Element", discloses use of finely divided dust-like materials composed essentially of vulcanizable synthetic rubber-like elastoprenes of the butadiene-acrylonitrile copolymer type compounded with about 5% to about 10%, by weight, of sulfur. These materials provide useful friction-controlling or friction-stabilizing agents in friction elements.

U.S. Pat. No. 3,007,890 of S. B. Twiss et al, entitled "Friction Elements and Method of Making Same", discloses the use of high molecular weight, high acrylonitrile content, butadiene-acrylonitrile copolymer, synthetic rubber-like elastoprenes give superior stable friction elements with a high level of friction coefficient at high temperatures in over a wide range of temperatures.

U.S. Pat. No. 3,007,549 of B. W. Kline, entitled "Friction Controlling Means", discloses a multi component, friction producing device.

U.S. Pat. No. 2,685,551 of R. E. Spokes, entitled "Friction Elements and Methods of Making Same", discloses friction elements employing synthetic rubber is the principal ingredient in the bonding agent. Bonding agents commonly comprise thermosetting resins and/or a synthetic rubber.

It has been observed that carbon fibers that have undergone the balling phenomena will not permit a resin to uniformly distributed throughout the ball. When these materials are on a machined surface of a brake pad, they form high friction scratchy zones that play havoc with a brake disc. Optimum wear properties and optimum performance properties occur when very uniform fibers in terms of both length and diameter are fully and uniformly dispersed throughout the brake pad in such a manner so as to avoid surface discontinuities such as described above.

Though the art teaches a way to disperse carbon fibers in an aqueous or liquid medium generally, there is no teaching disclosing how to avoid the "balling tendency" in a totally dry blending process which does not involve any liquid phase dispersion of the carbon fiber.

Accordingly, it is an object of this invention to find a way to dry blend carbon fibers into a dry resin matrix so as to avoid the "balling phenomena" and capitalize to the extent possible on the benefits that are otherwise available from having fibers of uniform diameters and lengths.

Other objects of this invention will be clear to one skilled in the art based upon the teachings herein disclosed.

BRIEF DESCRIPTION OF THE INVENTION

This invention is primarily concerned with uniform fibers having diameters preferably in the range of about 5 microns to about 20 microns and lengths preferably in the range of about 350 microns to about 600 microns. The optimum lengths for fibers in brake pads are generally in the range of about 400 microns to about ½ inch and diameters, 5 to 20 microns.

This invention, however, has broader applications in terms of distributing any fiber which has a tendency to undergo a balling phenomena when introduced as a dry material directly into a dry blender containing dry matrix material. For example, fiber having a diameter in the range of about 5 to 20 microns and lengths from 50 microns to a ½ inch can be easily handled in the method and apparatus of this invention.

Essentially, this invention is directed to the observation that if fibers are first fluidized in a vaporous fluid, e.g. air, so that they are essentially a random mix of loosely as opposed to closely interacting discrete carbon fibers, such a fluidized distribution can be uniformly added to a dry blender containing a dry matrix material while such blender is in operation so as to result in a uniform distribution of the carbon fibers throughout the dry matrix material which substantially, if not totally, eliminates the phenomena of clumping into spheres, i.e. the "balling phenomenon".

When the fibers have diameters in the range of about 5 microns to about 20 microns and lengths in the range of about 50 microns to about ½ inch, the clumping into spheres tends to give rise to spherical particles having diameters in the range of about ⅛" to about ½".

DETAILED DESCRIPTION OF THE INVENTION

BRIEF DESCRIPTION OF THE DRAWINGS

FIG. 1 is a side elevation view partially in cross-section disclosing a fluidizing fiber feed system to a dry mixer.

FIG. 4 is a side elevation view along line C—C of FIG. 1.

FIG. 1 discloses a fiber fluidizer 10, a mixer 12, and a separator 14. In more detail, the fiber fluidizer 10 comprises a feed hopper 16, storage zone 18, a motor 20, drive shaft 22, bar or rod stirrer 24, double rod stirrer 26, bearing 27, exit chute 28, conduit 30, conduit connection 32, impeller fan 34, and conduit 38. Separator 14 comprises inlet 40, housing 41, vapor outlet 42, solids outlet 44, bag filter 46, filter zone housing 57, and conduit 48 to a low pressure zone (not shown). Mixer 12 comprises an inlet 44, blend outlet 45, a mixing zone 49, a primary motor 59, a secondary motor 60, a secondary stirrer 62, shaft 64, bearing 66, and primary stirrer blades 65.

Figure 3A:
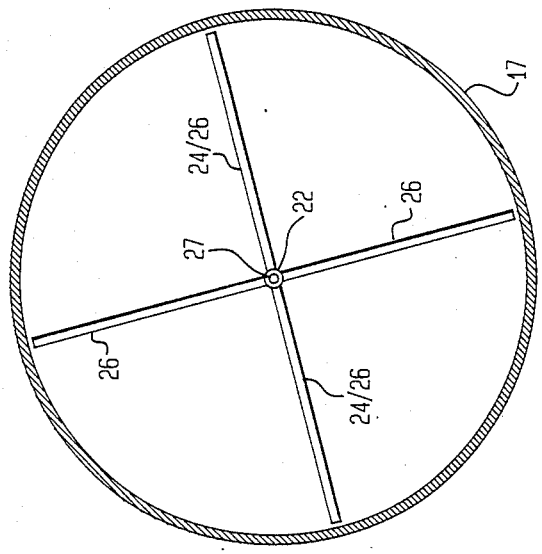
FIG. 3 is a top plan view along line A—A of FIG. 1.

Briefly, operation of the system disclosed in FIG. 1 is as follows. Carbon fibers are introduced into feed hopper 16 and drop into fiber storage zone 18. Motor 20 by moving, e.g. rotating, drive shaft 22 maintains the carbon fibers in an easily flowing state as a result of rod 24. It is to be noted that in most operating circumstances rod 24 is not critical and the apparatus can be run with or without rod 24. Fibers, such as carbon fibers, rest on bottom 25 of storage zone 18. Rod 26 shown in top plan view in FIGS. 2 and 3 is sufficiently close to the bottom 25 so as to permit sufficient clearance to induce the fibers to move around until they are in alignment with exit chute 28 which has a pie shaped opening 29.

Figure 2A:
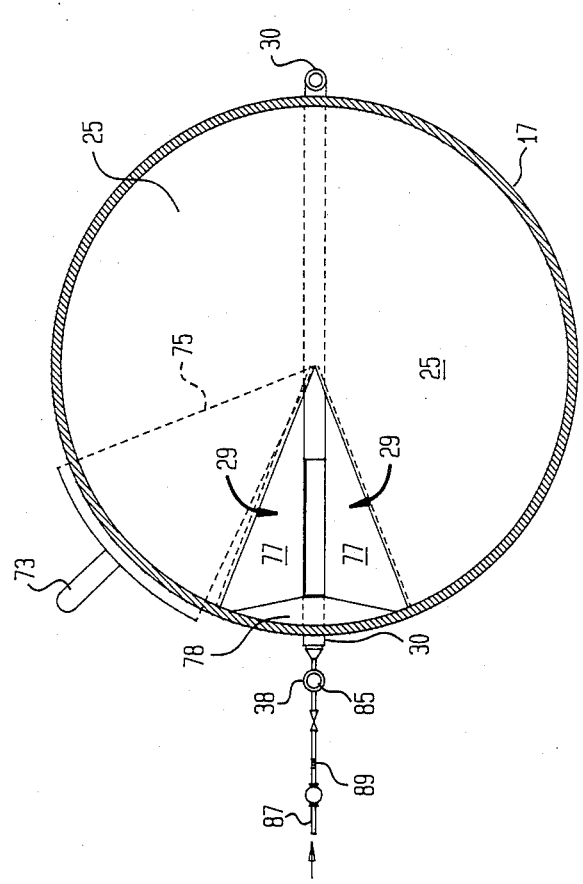
FIG. 2 is a top plan view along line B—B of FIG. 1.

The adjustable pie shaped opening 29 through valve wedge or plate 75 shown in FIG. 2 is adjustable by moving valve wedge 75 with slide pull 73 to give an angle generally in the range of 5° to 90°. If the pie shaped opening is too open then the conduit plugs. Chute walls 77 and 78 provide a pathway into the interior of conduit 30 that leads to motor housing 80. If the pie shaped opening 29 is too small then an insufficient number of fibers fall through. The clearance between rod 26 and bottom 25 has been found in practice to be preferably in the range of about ¼ inch to ½ inch when the size of the carbon fibers are in length from 50 microns to ½ inch and in diameter from 5 to 20 microns. In practice, a useful clearance is about ⅜" for fibers having a median in length from 250 to 550 microns and in diameter from 5 to 20 microns. Rotational rate of rod 26 is in the range of about 5 to 100 revolutions per minute. With decreasing rotational speed, there is a slowing in fiber flow through opening 29.

Fibers passing through pie shaped opening 29 into exit chute 28 enter conduit 30 and are drawn by impeller fan 34 to move through the impeller blades 34 and impeller zone 52 into conduit 38. Impeller blades 34 move due to rotational torque supplied by motor 36.

At the top of fiber fluidizer 10, there is a conduit connection 32 which in a fluid tight connection insures flow of entrained fibers near the top of storage zone 18 to enter into conduit 30 without escaping into the environment. Flow into conduit 30 arises due to lower pressure in conduit 30 as compared to that in storage zone 18.

The fluidized medium, e.g. air containing entrained fibers, moves through conduit 38 into inlet 40 of separator 14 at a fluid flow rate sufficient to maintain a homogeneous mixture of air and fiber; e.g. wherein the fiber does not settle out or cause blockage within conduit 38. We have found that fluid flow rates for a mixture of fibers such as described in this specification in the range of about 1,000 to about 6,000 or more feet per minute work satisfactorily.

Separator 14 is basically a cyclone which uses acceleration toward walls 41 to separate fibers from vapors or fluid medium. The fluid medium entering through inlet 40 is induced to swirl causing the fibers to be moved toward housing or walls 41 and then down through solids outlet 44 into mixing zone 49 of mixer 12. Vapors which have been separated from the fluid medium having entrained fibers is induced to move through vapor outlet 42. Vapors leaving through vapor outlet 42 enter a filter 46, a filtering zone housing 57 and then through a conduit 48 to a low pressure area (not shown). Bag filter or sock 46 is attached to the vapor outlet conduit by means of pinch clamp 47. The low pressure in conduit 48 can be due to a vacuum pump, for example.

Instead of having the impeller fan 34 located where it is, it is possible to have a vacuum system attached to conduit 48 to reduce flow of vapors in the directions indicated by flow arrows. It is possible to have an additional motor to induce flow of vapor downstream of conduit 48 in addition to or to the exclusion of motor 36 with impeller fans 34.

Figure 5:
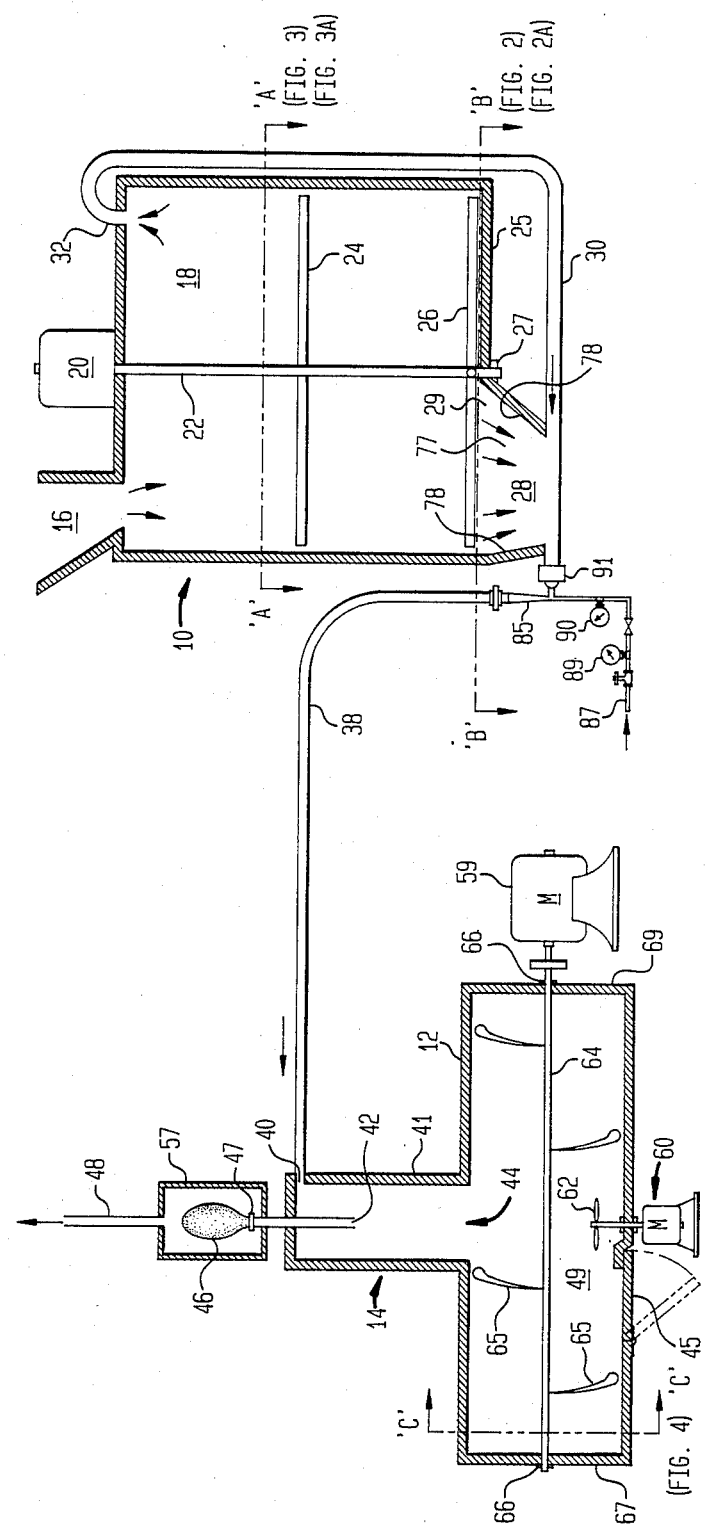
FIG. 5 is a side elevation view partially in cross-section disclosing an alternative embodiment to FIG. 1.

There is some desirability to avoid having impeller fan 34 in the location disclosed because it does cause some attrition and wear of the fibers. As an alternative to impeller motor 36 with impeller fan 34, an eductor 85 (shown in FIG. 5) may be used. In FIG. 5, corresponding elements to those shown in FIG. 1 have the same numbers. Briefly, air or other vaporous fluid, under pressure, acts as the motive force. A source (not shown) for such fluid enters conduit 87. Pressure gauges 89, 90, and 92 through valves in conduit 87 pemit one to select an appropriate pressure to ensure proper flow of fluid. Fiber enters the lower pressure inlet 91 under the influence of motive stream which enters through conduit 87. The two streams combine and flow into conduit 38. For example, pressure for gauge 90 are in the range of about 5 to 20 psig, and preferably, 7 to 12 psig, and for gauge 92, about 0.75 to 3 psig, and preferably, about 1 to 2 psig.

Other examples of means of dispersing carbon fibers in a fluidizing medium include brushing through a screen or sieve or forcing through a vibrating sieve into a flowing air stream.

The blend of fibers and matrix media which has been stirred by blades 65 mounted on shaft 64 attached to primary motor 59 and pivotally mounted by bearings to ends 67 and 69 of mixer 12, in a dry state in mixing zone 49 can be removed through blend outlet 45. Dotted outline shows blend outlet open and solid lines shows blend outlet closed. Optionally, secondary motor 60 provides additional stirring.

EXAMPLES

Example 1

This example is directed to the steps usually taken in the formation of brake pads. The example sets forth typical kinds of resins and the steps taken in adding asbestos fibers to a resin which is then molded and machined to form brake pads.

A brake lining converts kinetic energy into heat and then dissipates it to the surrounding equipment and environment. Brake linings are usually made of a resin matrix containing other components and a plethora of additives. The components and additives may include asbestos fibers, sulfur, zinc oxide, barytes, steel wool, graphite, metal fibers, zinc dust, iron oxide and rottenstone. Asbestos is used as major component because of its good thermal stability, low cost, high friction and good reinforcing properties. A typical pad comprises, in weight percent of total pad weight: 22% acrylonitrile/-butadiene copolymer, 49% asbestos, 2% sulfur, 11.5% barytes, and 11.5% rottenstone. Blending of the components and additives involves charging to a Littleford mixer where thay are stirred together. The blended mix is then formed into briquettes hot pressed at 160° to 180° C. for 5 to 15 minutes to form brake pads. The pads are then baked at 220° to 300° C. for 4 to 8 hours. These baked pads are then drilled and ground to tolerances to make the finished brake pad.

Sometimes synthetic resins such as phenolics or cresylic resins are used usually modified with drying oils, rubber, and epoxies.

The particle size of the synthetic resin in spherical equivalents is preferably in the range of about 0.1 to 250 microns and more preferably in the range of about 1 to 100 microns.

Example 2

In the example there is a discussion of the apparatus, and the carbon fibers used to prepare brake pads using a dry blender. The key point of this example is that no matter how well dispersed the carbon fibers are prior to addition to the mixer if they are added as an *unfluidized* collection of fibers, e.g. as a cluster of fibers, then the balling phenomena occurs.

A typical batch of brake pad mixture would be made by weighing and charging the weighed components into a Littleford dry mixer. The mixer equipment typically is a Littleford Brothers mixer which is a horizontal cylinder. Inside this horizontal cylinder, a series of plows turn around inside the circumferential surface and there is a high shear chopper entering from the lower side at a 45 degree angle. After each of the components have been charged to the unit, both the plows and the chopper are turned on for about 5 minutes which thoroughly mixes the dry components into a homogenous mix, except when an amorphous Ashland carbon fiber is included. These Ashland carbon fibers have a propensity to form balls and not disperse. The reason for the balling is thought to be caused by the uniformity of the particles, the roughness of the surface, and the stiffness of the fiber. Since the particles are subject to static charge, this phenomenon may play a part in the initial cohesiveness of the carbon fibers particles. When the carbon fiber balls form in the mix, the blend is unusable. When processed into brake pads, it shows as discernible spots on the wearing face. This causes two problems, the fibers are not arranged to give maximum strength and the "spots" are harder and more abrasive than the surrounding matrix. These hard spots cause grooves to be worn in mating surfaces.

Example 3

This example will disclose that if a fluidizing step is employed, then carbon fiber spheres do not appear in the finished brake pads.

This description shows how the carbon fibers are added to the brake mix to avoid the balling of the carbon fibers. All other components are added to the Littleford mixer. The carbon fiber portion of the mix is added to the storage hopper of the fiber fluidizer with the impeller fan running. During the charging, the bottom valve is closed. The primary reason for this configuration is to reduce the amount of dust emanating from the hopper during the carbon fiber charging. With both the plow-like agitator and the high-speed chopper running in the Littleford mixer, the storage hopper agitator is started and the valve on the bottom of the storage hopper is opened sufficiently to establish the correct addition rate. The bottom rod sweep on the hopper agitator carries the fiber over the pie-shaped opening where it falls into a chute. This opening doesn't necessarily have to be pie-shaped. Any opening that will allow the fiber to fall through will suffice. This opening could be a sieve or screen. The carbon fiber falling through the chute contacts the moving air stream where it mixes with the air and is carried through an impeller fan. The fluidized carbon fiber is then carried to a separator (cyclone) mounted on the Littleford mixer. The cyclone doesn't have a cone shaped bottom, but is straight sided. The carbon has a tendency to bridge and, if the angle of the sides is insufficiently inclined, the fiber will clog the outlet. The fiber drops out of the cyclone into the agitated brake pad mix in more or less individual fibers. These fibers are coated and mixed with the other components before they are able to agglomerate into balls or clumps. After all of the fibers have been blown in, the mix is agitated for a few minutes, the agitators are shutdown and the brake mix is discharged through the solids outlet in the bottom of the mixer. The fluidizing air plus the air necessary for bearing purge is exhausted through the tube in the cyclone then into a filter sock to retain particulates of dust, and/or brake mix components.

In place of the motor driven fan, an eductor as shown in FIG. 5 may be used. The eductor uses a motive fluid of air to cause a low pressure area which sucks in fiber and air. This fluidized fiber is then conveyed to the mixer in much the same manner as with the fan.

"Equivalent spherical diameter" for a particular particle as used throughout the specification and claims means that diameter a spherical particle would have to have the same surface to volume ratio as the particular particle in question.

Reference to patents made in the Specification is intended to result in such patents being expressly incorporated herein by reference including any patents or other literature references cited within such patents.

Specific compositions, methods, or embodiments discussed are intended to be only illustrative of the invention disclosed by this Specification. Variation on these compositions, methods, or embodiments are readily apparent to a person of skill in the art based upon the teachings of this Specification and are therefore intended to be included as part of the inventions disclosed herein. For example, instead of a pie-shaped opening, other shapes are possible. We have found that a circular opening having a sieve through which fiber must pass can also work. Preferably, the sieve has openings in the range of about 10 to about 2,000 microns and will vary somewhat depending upon median fiber dimensions.

What is claimed is:

1. An apparatus for dispersing fibers in a dry matrix blend comprising:
   A. fluidizing means for fluidizing of a fiber in a vaporous fluid to produce an entrained fiber, said fluidizing means having a fluidized-fiber-outlet and a fiber-inlet;
   B. a transferring means for transferring entrained fibers, said transferring means having a transfer-means-inlet and a transfer-means-outlet;
   C. a separating means for separating fibers from a vaporous fluid to produce separated fibers, said separating means comprising a separating-means-inlet, a fluid-outlet, a separated-fiber-outlet; and
   D. a mixing-means with a mixing-means-inlet and a mixing-means-outlet for mixing said separated fibers from said vaporous fluid with a dry matrix material to form a mixture of said separated fibers and said dry matrix; wherein addition of said separated fiber to said mixing-means through said mixing-means-inlet and said mixing are coordinated so that clumping of said fibers is avoided;

wherein said fluidized-fiber-outlet is in fluid communication with said transfer-means-inlet and wherein said transfer-means-outlet is in fluid communication with said separating-means-inlet and wherein said separating-means-fiber-outlet is in fluid communication with said mixing-means-inlet.

2. The apparatus of claim 1, wherein said fluidizing means comprises:
   a storage zone having said fiber-inlet;
   and said fluidized-fiber-outlet is in fluid communication with said transferring means; and
   a means for inducing flow from within said zone through said fluidized-fiber-outlet.

3. The apparatus of claim 1, wherein said fluidized-fiber-outlet is pie-shaped.

4. The apparatus of claim 2, wherein said fluidized-fiber-outlet is pie-shaped.

5. The apparatus of claim 3, wherein said pie-shaped outlet has an angle in the range of about 5° to 90° out of a total of 360°.

6. The apparatus of claim 1, wherein within said fluidized-fiber-outlet is a sieve having openings in the range of about 10 to 2,000 microns, through which fibers must pass before exiting therefrom.

7. The apparatus of claim 1, wherein said transferring-means comprises a conduit with a means for inducing flow of a vaporous fluid.

8. The means in claim 7 for inducing flow in said conduit is an impeller within a housing.

9. The means in claim 7 for inducing flow in said conduit is a vaporous fluid.

10. the apparatus of claim 7, wherein said fluidizing means has, in addition to said fluidized-fiber-outlet and said fiber-inlet, an entrained-fiber-outlet above a dense fluidized bed of said fibers which bed is within said fluidizing means, and wherein said conduit has, in addition to said transfer-means-inlet and said transfer-means-outlet, an entrained-fiber-inlet, wherein said entrained-fiber-inlet is in fluid communication with said entrained-fiber-outlet.

11. The apparatus of claim 7, wherein said separating means has said separating-means-inlet in fluid communication with said transferring-means-outlet so as to induce a cyclonic flow within said separating-means, whereby fiber exits through said separating-means-fiber-outlet and vaporous fluid exits through said fluid-outlet.

12. The apparatus of claim 1, wherein said mixing-means has a stirrer oriented so as to cause top-to-bottom mixing.

13. The apparatus of claim 12, wherein said mixing means has a secondary mixer which induces mixing in a substantially horizontal plane.

* * * * *